United States Patent [19]

Goto et al.

[11] Patent Number: 5,737,339

[45] Date of Patent: Apr. 7, 1998

[54] METHOD AND APPARATUS FOR VERIFYING STORED DATA

[75] Inventors: Kota Goto; Norio Koyanagi, both of Kawasaki, Japan

[73] Assignee: Fujitsu Limited, Kawasaki, Japan

[21] Appl. No.: 573,877

[22] Filed: Dec. 18, 1995

Related U.S. Application Data

[63] Continuation of Ser. No. 212,791, Mar. 15, 1994, abandoned.

[30] Foreign Application Priority Data

Feb. 8, 1994 [JP] Japan .................. 6-014611

[51] Int. Cl.⁶ .................................................. G06K 7/00
[52] U.S. Cl. ............................................... 371/21.2
[58] Field of Search ................. 371/21.2; 364/237.85; 235/462; 382/182, 183; 396/300

[56] References Cited

U.S. PATENT DOCUMENTS

| | | | |
|---|---|---|---|
| 4,251,798 | 2/1981 | Swartz et al. | 340/146.3 |
| 4,255,792 | 3/1981 | Das | 364/580 |
| 4,471,218 | 9/1984 | Culp | 235/472 |
| 4,559,626 | 12/1985 | Brown | 371/21 |
| 4,675,840 | 6/1987 | Raymond et al. | 364/513.5 |
| 4,916,441 | 4/1990 | Gombrich | 340/712 |
| 4,941,201 | 7/1990 | Davis | 455/41 |
| 5,065,360 | 11/1991 | Kelly | 395/800 |
| 5,380,994 | 1/1995 | Ray | 235/472 |
| 5,382,779 | 1/1995 | Gupta | 235/383 |
| 5,488,575 | 1/1996 | Danielson et al. | 364/707 |
| 5,504,315 | 4/1996 | Hardesty et al. | 235/462 |
| 5,510,606 | 4/1996 | Worthington et al. | 235/472 |

*Primary Examiner*—Robert W. Beausoliel, Jr.
*Assistant Examiner*—Stephen C. Elmore
*Attorney, Agent, or Firm*—Staas & Halsey

[57] ABSTRACT

An apparatus for verifying stored data comprises a memory unit, a setting unit, an output unit, and a control unit. The memory unit stores a plurality of addresses and a plurality of data as the stored data so that the data are associated with the addresses respectively. The setting unit sets a plurality of the data to a plurality of the addresses of the memory unit and selects any of the addresses. The output unit outputs general data which is different from the data and verify the contents of the data stored in the memory unit. The control unit reads out the contents of the stored data corresponding to the address selected by the setting unit from the memory unit to the output unit.

27 Claims, 19 Drawing Sheets

| | DIGIT 4 3 2 1 |
|---|---|
| FUNCTION 1 | 0 0 0 0 |
| FUNCTION 2 | 0 0 0 1 |
| FUNCTION 3 | 0 0 1 0 |
| FUNCTION 4 | 0 0 1 1 |
| FUNCTION 5 | 0 1 0 0 |
| ⋮ | ⋮ |
| FUNCTION n | 1 1 1 1 |

| | DIGIT 8 7 6 5 4 3 2 1 |
|---|---|
| SETTING 1 | 0 0 0 0 0 0 0 0 |
| SETTING 2 | 0 0 0 0 0 0 0 1 |
| SETTING 3 | 0 0 0 0 0 0 1 0 |
| SETTING 4 | 0 0 0 0 0 0 1 1 |
| SETTING 5 | 0 0 0 0 0 1 0 0 |
| SETTING 6 | 0 0 0 0 0 1 0 1 |
| ⋮ | ⋮ |
| SETTING n | 1 1 1 1 1 1 1 1 |

| STORED DATA | NUMBER OF TIMES |
|---|---|
| DATA D1 | 1 |
| DATA D2 | 2 |
| DATA D3 | 3 |
| ⋮ | ⋮ |
| DATA Dn | n |

FIG.16

| STORED DATA | OUTPUT INFORMATION |
|---|---|
| DATA D1 | GREEN LIGHT EMITTING DIODE |
| DATA D2 | RED LIGHT EMITTING DIODE |
| DATA D3 | SPEAKER |
| ⋮ | ⋮ |
| DATA Dn | ELEMENT n |

33

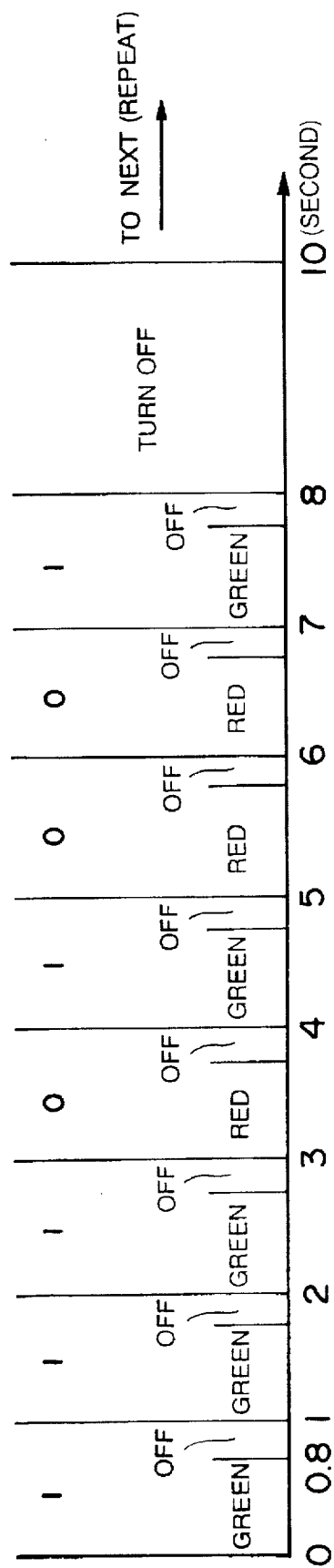

5,737,339

METHOD AND APPARATUS FOR VERIFYING STORED DATA

This application is a continuation of application Ser. No. 08/212,791, filed Mar. 15, 1994, now abandoned.

BACKGROUND OF THE INVENTION

1. Field of the Invention

This invention relates to a method and an apparatus for verifying values of data set in a memory through a setting unit.

2. Description of the Related Art

Today, it is required that one device have various kinds of functions. Typically, a setting unit writes various kinds of functions and setting data so that the functions are associated with the setting data to the memory provided in the apparatus. As the setting unit selects any of the various kinds of functions, the setting data associated with the function is read from the memory. For instance, an output unit already provided in a bar code scanner, such as a speaker or a light emitting diode, informs the operator that the bar code scanner has read a bar code. When the bar code has been read correctly, the speaker outputs a verification-voice or the light emitting diode emits a light. In the bar code scanner, the setting unit writes voice volume data or frequency data for setting a voice volume and a voice pitch output from the speaker to the memory. In this case, the function of the voice volume and the voice pitch are associated with each address.

Once these data are set in the memory, the operator cannot memorize which data are set in each of the addresses of the memory. Consequently, the operator must verify which data is associated with each of the addresses. In this case, the data written in the memory are output to a dedicated output unit such as a speaker or a dedicated type display which is different from the output unit already provided in the apparatus. The operator can thereby verify the values of the data stored in the memory. The conventional apparatus has the dedicated output unit besides the output unit already provided in the apparatus. The complex structure of the apparatus is, therefore, relatively expensive.

SUMMARY OF THE INVENTION

It is an object of the present invention to provide a method and an apparatus for verifying values of data stored in a memory without using a dedicated output unit.

The apparatus for verifying stored data according to the present invention comprises a memory unit, a setting unit, an output unit, and a control unit. The memory unit stores a plurality of addresses and a plurality of data so that the addresses are associated with the data respectively. The setting unit sets a plurality of the data to a plurality of the addresses in the memory unit and selects any of the addresses. The output unit outputs general data which are different from the data and verifies the values of the data stored in the memory unit. The control unit reads out the values of the data associated with the addresses selected by the setting unit to the output unit.

The data comprises a plurality of bits of data in binary form represented by "0" and "1". Each bit data is transferred to the output unit one after another. The control unit is provided with a data determination unit and an output control unit. The data determination unit is for sequentially determining whether each bit data is "0" or "1". The output control unit responds to the value of each bit data determined by the data determination unit to activate or not activate the output unit in accordance with every bit data.

The method for verifying stored data of the present invention includes a memorizing step, a setting step, an outputting step, and a controlling step. The memorizing step is for storing a plurality of addresses and a plurality of data to the memory so that the addresses are associated with the data respectively. The setting step is for setting the plurality of data to the plurality of address of the memory and for selecting any of said plurality of addresses. The controlling step is for reading out the values of the data associated with the address selected in the setting step. The outputting step is for outputting general data which are different from the data and for verifying the values of the data read out in the controlling step.

According to the structure of the apparatus for verifying stored data of the present invention, the setting unit has previously set a plurality of the addresses and a plurality of the data in the memory unit so that the addresses are associated with the data respectively. As the setting unit selects any of the addresses, the control unit reads out the values of the data corresponding to the address selected by the setting unit. The output unit verifies the values of the data read out by the control unit. That is to say, the output unit outputs general data different from the stored data which indicates an operation status of a device. A dedicated output unit verifying the values of the data is, therefore, not necessary. Furthermore, it is possible to decrease the cost related to the output unit.

If so, the data to be verified cannot be simultaneously represented. For example, the output unit outputs 1-bit data only, and the data to be verified includes data larger than 2-bit data. In this case, the data determination unit determines the value of each bit data, "1" or "0", read out from the memory unit, sequentially. Corresponding to the value, for example, one lamp turns on or off sequentially. Therefore, an operator can verify a value of the data using a lamp having a simple structure without using the dedicated output unit, because each bit of data is output sequentially to one lamp. The data verified by the lamp is already stored in the memory unit.

BRIEF DESCRIPTION OF THE DRAWINGS

FIG. 5 (PRIOR ART) is a diagram showing addresses set by a dip switch.

FIG. 6 (PRIOR ART) is a diagram showing data set by the dip switch.

FIG. 14 is a diagram showing a counting table according to the fourth embodiment of the present invention.

FIG. 16 is a diagram showing an output table according to the fifth embodiment of the present invention.

FIG. 21 is an exemplified diagram for use in describing a verification of stored data according to the eighth embodiment of the present invention.

DETAILED DESCRIPTION OF THE PREFERRED EMBODIMENTS

Embodiments of a method and an apparatus for verifying stored data according to the present invention will be described hereinafter.

[First Embodiment]

Figure 1:
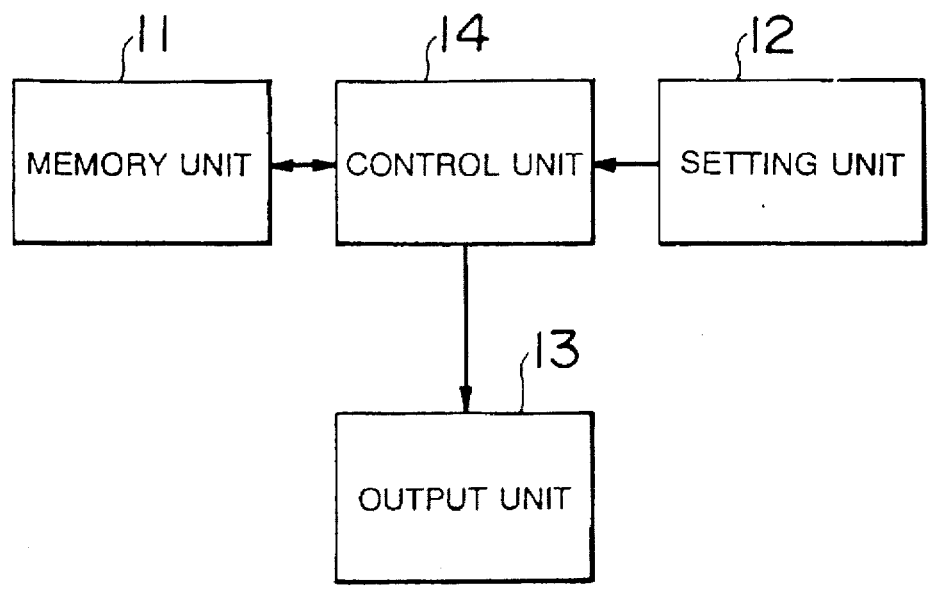
FIG. 1 is a block diagram showing an apparatus for verifying stored data according to a first embodiment of the present invention.

A first embodiment of the present invention is now described. FIG. 1 is a structural block diagram showing an apparatus for verifying stored data according to the first embodiment of the present invention. The apparatus for verifying stored data of the present invention comprises a memory unit 11, a setting unit 12, an output unit 13, and a control unit 14.

The memory unit 11 stores a plurality of addresses and a plurality of data so that the addresses are respectively associated with the data. The memory unit 11 is a data writable memory such as a random access memory (RAM) or an electrically erasable ROM (EEROM). The setting unit 12 sets a plurality of the data as stored data to a plurality of the addresses in the memory unit 11 and selects any of the addresses. The setting unit 12 may be a dip switch, a key board or the like. The output unit 13 outputs general data which are different from the stored data and verifies the values of the stored data stored in the memory unit. That is to say, the output unit 13 is able not only to output general data, but also to verify the values of the stored data. The output unit 13 may be a light emitting diode, a lamp, a speaker, a buzzer or the like. The control unit 14 is connected to and controls the memory unit 11, the setting unit 12, and the output unit 13. The control unit 14 reads out the values of the stored data from the memory unit 12 to the output unit 13 wherein the stored data is associated with the address selected by the setting unit 12. The control unit 14 may be a central processing unit (CPU), a microprocessor or the like.

Figure 2:
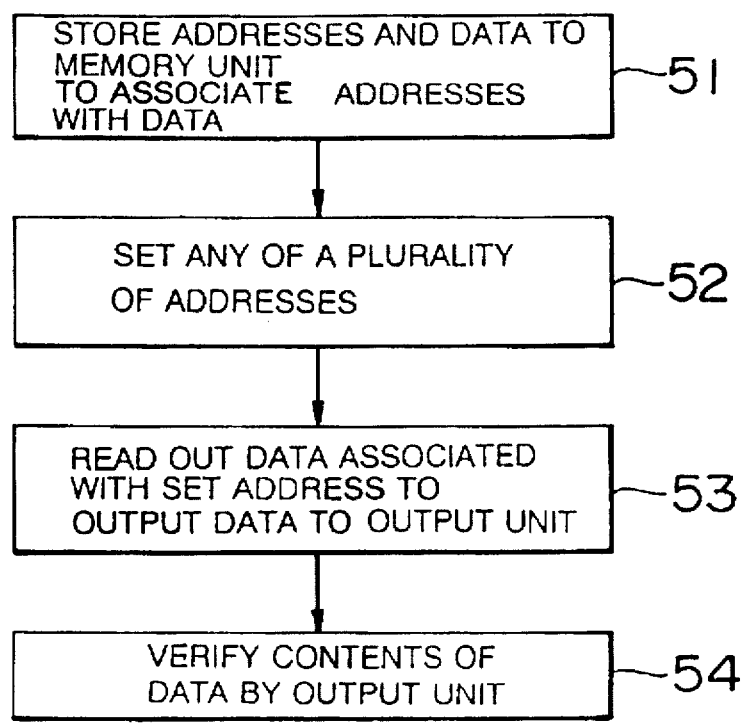
FIG. 2 is a flow chart showing a method for verifying stored data according to the first embodiment of the present invention.

FIG. 2 is a flow chart showing a method for verifying stored data according to the first embodiment of the present invention. First, the setting unit previously sets a plurality of the addresses and a plurality of the data so that the addresses are associated with the data, to the memory unit 11 (Step 51). At this point, it is assumed that the operator is blind to the values of the stored data set in each address. Next, the setting unit 12 selects any of the plurality of addresses (Step 52). The control unit 14 reads out the values of the stored data from the memory unit 11 to the output unit 13 wherein the stored data is associated with the address selected by the setting unit 12 (Step 53). The output unit 13 verifies the values of the stored data read out by the control unit 14. That is to say, the output unit 13 is able not only to output general data excluding the stored data, but also to verify the values of the stored data. Thereby, a dedicated output unit for verifying the values of the stored data is not necessary. Furthermore, it is possible to decrease the cost of the output unit.

[Second Embodiment]

Figure 3:
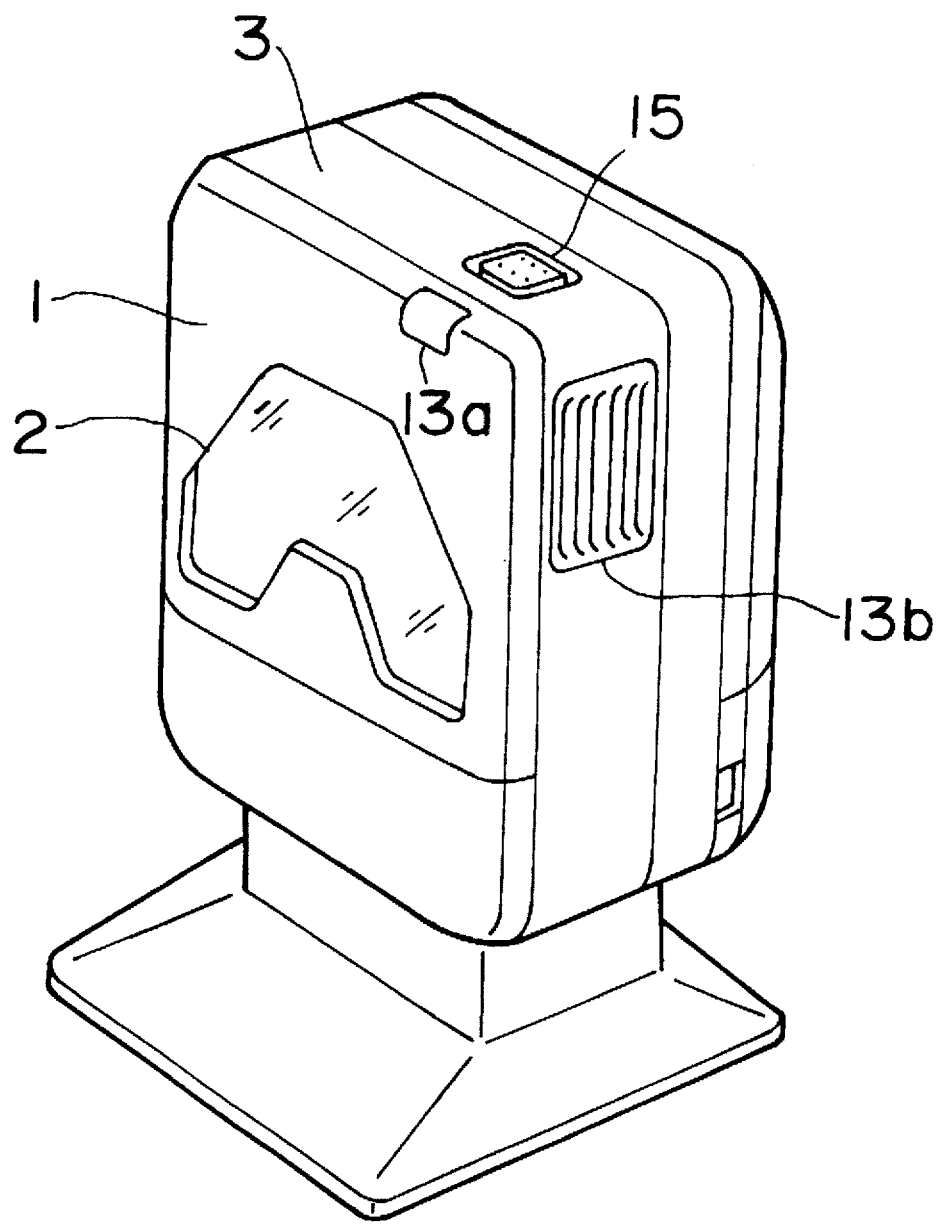
FIG. 3 is an outside view of a bar code scanner including an apparatus for verifying stored data according to a second embodiment of the present invention.

A second embodiment of the present invention is now described. FIG. 3 is an outside view of a bar code scanner including an apparatus for verifying stored data according to the second embodiment. The bar code scanner irradiates a bar code by a laser beam to read bar code data in accordance with reflected light reflected from the bar code.

Referring to FIG. 3, a reading window 2 is disposed on a front portion 1 of the bar code scanner. The reading window 2 irradiates the bar code (not shown) by the laser beam to read the bar code data in accordance with the reflected light reflected from the bar code. A light emitting diode 13a is disposed on the front portion 1 to indicate that the bar code has been read. A starting switch 15 is disposed on a side portion 3 to activate the bar code scanner. A speaker 13b is disposed on the side portion 3 to inform the operator that the bar code has been read.

Figure 4:
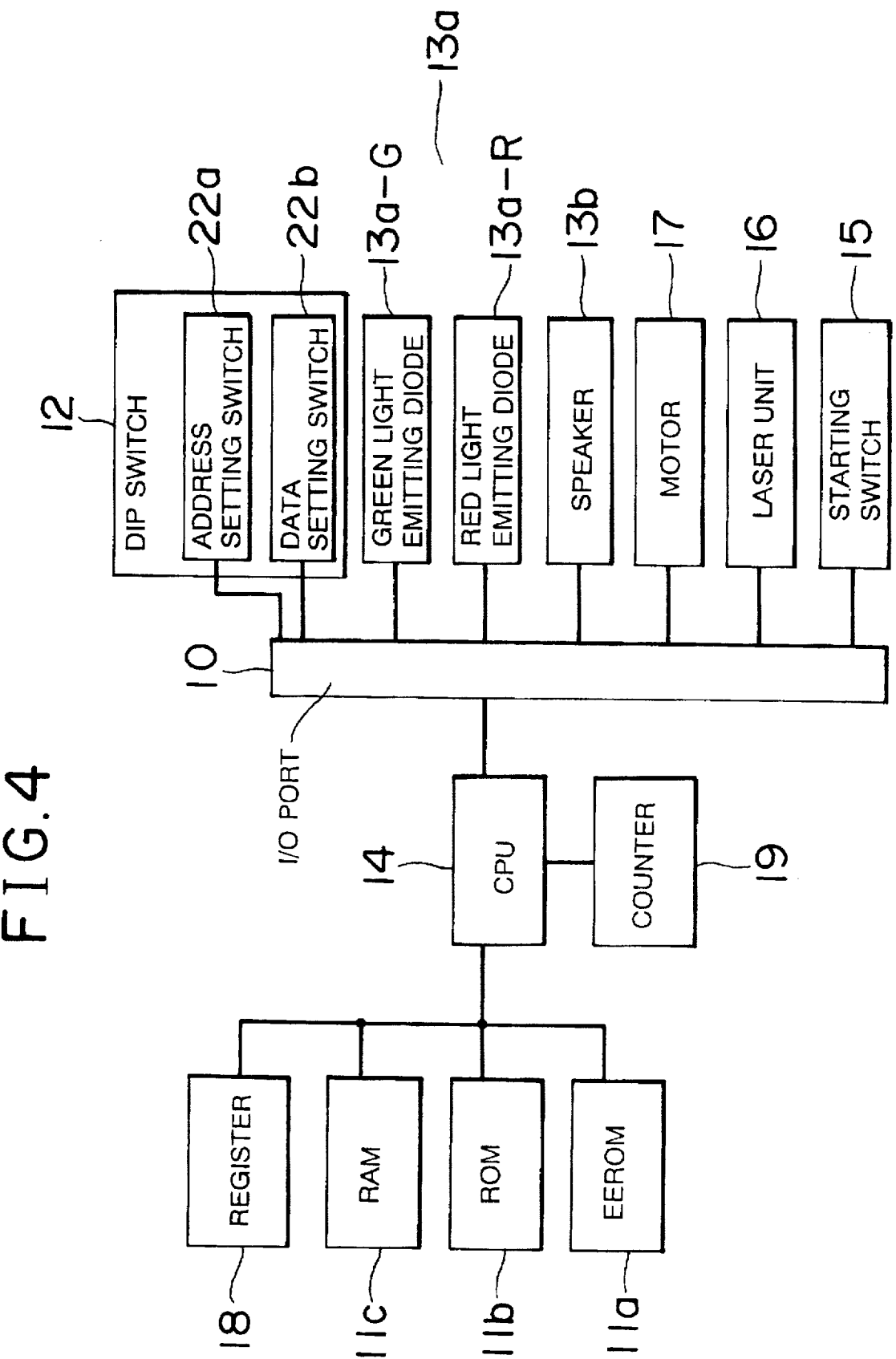
FIG. 4 is a structural block diagram showing the bar code scanner according to the second embodiment of the present invention.

FIG. 4 is a structural block diagram showing the bar code scanner according to the second embodiment of the present invention. An I/O port 10 controls input/output of each data. The I/O port is connected to a dip switch 12, a green light emitting diode 13a-G, a red light emitting diode 13a-R, and a speaker 13b. Furthermore, the I/O port 10 is connected to a central processing unit (hereinafter called a CPU) 14, the starting switch 15, a laser unit 16, and a motor 17. The CPU 14 is connected to an EEROM 11a, a ROM 11b, a RAM 11c a register 18, and a counter 19.

The dip switch 12 comprises an address setting switch 22a and a data setting switch 22b. The address setting switch 22a sets different addresses at a plurality of functions, respectively. At this event, the functions are voice volume and frequencies of the speaker and the like. The address setting switch 22a sets, for instance, 4 bit addresses which are different from each other at each of a plurality of the functions as shown FIG. 5. The address setting switch 22a has bit switches (not shown) corresponding to each bit. Each bit switch sets "1" or "0". The address setting switch 22a sets, for instance, "0000" to a function 1. The data setting switch 22b sets 8-bit data which are different from each other at each of a plurality of settings. The data setting switch 22b has bit switches (not shown) corresponding to each bit, respectively. Each bit switch sets "1" or "0". For instance, the data setting switch 22b sets "00000000" to a setting 1 as shown in FIG. 6. This data comprise 8-bit data in binary represented by "0" and "1".

The EEROM 11a is a memory which can erase the stored data and rewrite other data. The EEROM 11a stores a plurality of the addresses previously set by the address setting switch 22a and a plurality of the data as stored data previously set by the data setting switch 22b wherein a plurality of the data is associated with a plurality of the addresses respectively. The light emitting diode 13a comprises a green light emitting diode 13a-G and a red light emitting diode 13a-R. The green light emitting diode 13a-G and the red light emitting diode 13a-R are for informing the operator that the bar code has been read and is used in verification of the values of the data stored in the EEROM 11a. The laser unit 16 irradiates a bar code by the laser beam to input the light reflected from the bar code. The motor 17 drives the laser unit 16.

The register 18 stores the address selected by the address setting switch 22a and the data to be verified wherein the data are associated with the selected address. The register 18 is a n-bit memory which can store an n-bit address and an m-bit length address. The counter 19 counts the number of bits when the stored data to be verified comprises a plurality of bits of data. The RAM 11c stores a bar code demodulator program and a verifying program for verifying the stored data. The CPU 14 controls the EEROM 11a, the ROM 11b, the RAM 11c, the register 18, and the counter 19. The CPU 14 demodulates the bar code by executing the bar code demodulator program stored in the RAM 11c.

Figure 7:
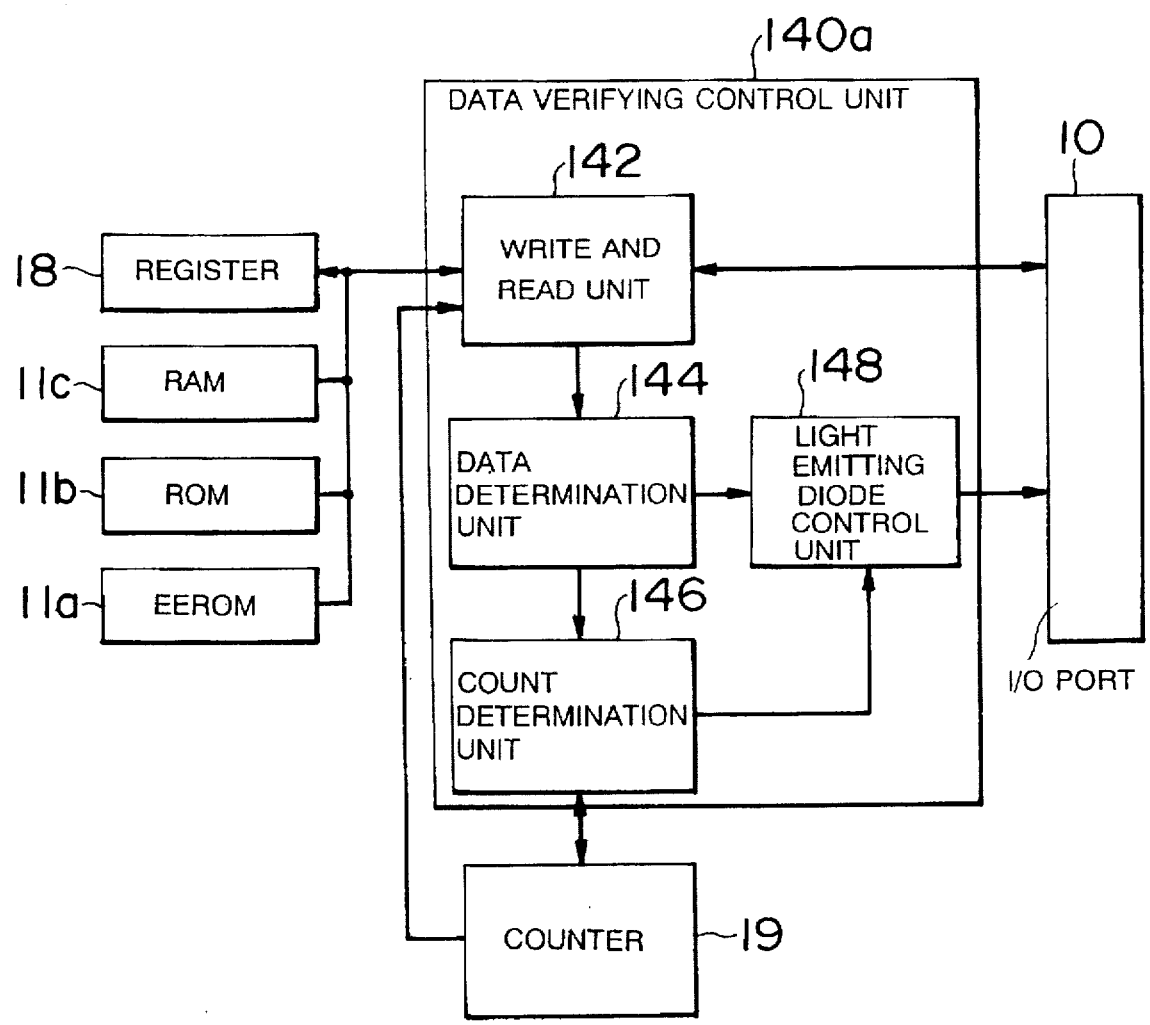
FIG. 7 is a structural block diagram showing a data verifying control unit and a circuit around the unit according to the second embodiment of the present invention.

FIG. 7 is a structural block diagram showing a data verifying control unit and a circuit around the unit according to the second embodiment. The data verifying control unit 140a processes to verify the data by executing the verifying program. The data verifying control unit 140a comprises a write and read unit 142, a data determination unit 144, a count determination unit 146, and a light emitting diode control unit 148. The write and read unit 142 is connected to the I/O port 10, the EEROM 11a, and the register 18. When the address setting switch 22a selects any of the addresses to verify the data, the write and read unit 142 writes the selected address to the register 18 through the I/O port 10. The write and read unit 142 reads out the stored data from the EEROM 11a wherein the stored data are associated with the address selected by the address setting switch 22a.

The write and read unit 142 writes the read out data from the EEROM to the register 18 being N-bit length. The write and read unit 142 reads out the read out data written in the register 18 from the front bit of the read out data one by one. The write and read unit 142 is connected to the data determination unit 144.

The data determination unit 144 determines whether the bit data is "0" or "1" from the front bit of the read out data one by one. The data determination unit 144 is connected to the light emitting diode control unit 148. When the bit data is "1", the light emitting diode control unit 148 turns on the green light emitting diode 13a -G for one second. When the bit data is "0", the light emitting diode control unit 148 turns on the red light emitting diode 13a-R for one second.

The data determination unit 144 is connected to the count determination unit 146. The counter 19 counts up the counter value every time the data from the register 18 is read out bit by bit. The count determination unit 146 determines whether the count value of the counter 19 is the same number of the data bits to be verified or not.

When the count value is not same the number of the data bits to be verified, the count determination unit 146 increments the count value of the counter 19 by 1 only. When the count value reaches the same number of the data bits to be verified, the light emitting diode control unit 148 turns off the red light emitting diode 13a-R and the green light emitting diode 13a-G for a predetermined period. After resetting the count value to "0", the counter 19 counts again the count value from "0".

Next, the description will now be made regarding a method for verifying the stored data which is accomplished by the bar code scanner according to the second embodiment. First, each different 4-bit address is previously set by the address setting switch 22a at each function. Each different 8-bit data is previously set by the data setting switch 22b at each of a plurality of the settings. The data set by the data setting switch 22b is stored to the address set by the address setting switch 22a. Each stored data associated with each address is written in the EEROM 11a. Each address is an address set by the address setting switch 22a. It is assumed that the operator is blind to the values of the stored data.

Figure 9:
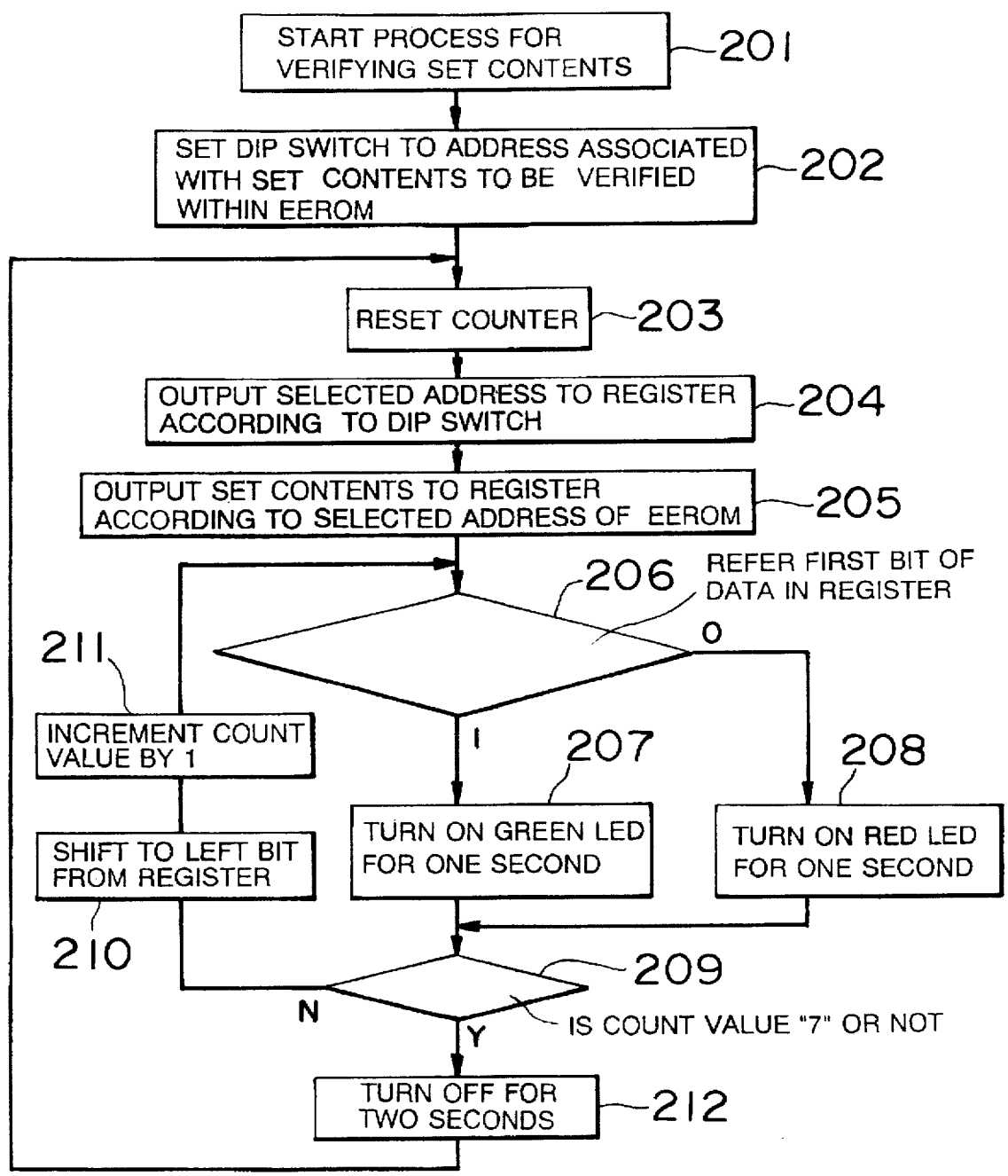
FIG. 9 is a flow chart showing a stored data verifying method according to the second embodiment of the present invention.

Then, referring to FIG. 9, the verification process of the values of the stored data set in the EEROM is started (Step 201). After the switch is set to start, the address may be set. The operator sets the address setting switch 22a to the address associated with the stored data which is to be verified and is set in the EEROM 11a (Step 202). The counter 19 resets the count value (Step 203). The write and read unit 142 reads out the setting address set in the address setting switch 22a to output the setting address to the register 18 (Step 204). Furthermore, the write and read unit 142 reads out the stored data associated with the setting address by referring to the setting address stored in the EEROM 11a (Step 205). The setting address is an address set to the register 18. A read address is set to the register 18.

As the write and read unit 142 has read out the first bit (front bit) of the setting data stored in the register 18, the data determination unit 144 determines whether the bit data is "1" or "0" (Step 206). In this event, when the data determination unit 144 has determined that the bit data is "1", the light emitting diode control unit 148 turns on the green light emitting diode 13a-G for one second (Step 207). When the data determination unit 144 has determined that the bit data is "0", the light emitting diode control unit 148 turns on the red light emitting diode 13a-R for one second (Step 208). Next, the count determination unit 146 determines whether the count value of the counter 19 is "7" or not (Step 209). In this case, the count value varies from "0" to "7" because the stored data is 8 bits. When the count determination unit 146 has determined that the count value is not "7", the counter 19 increments the count value by 1 only (Step 210).

Figure 8:
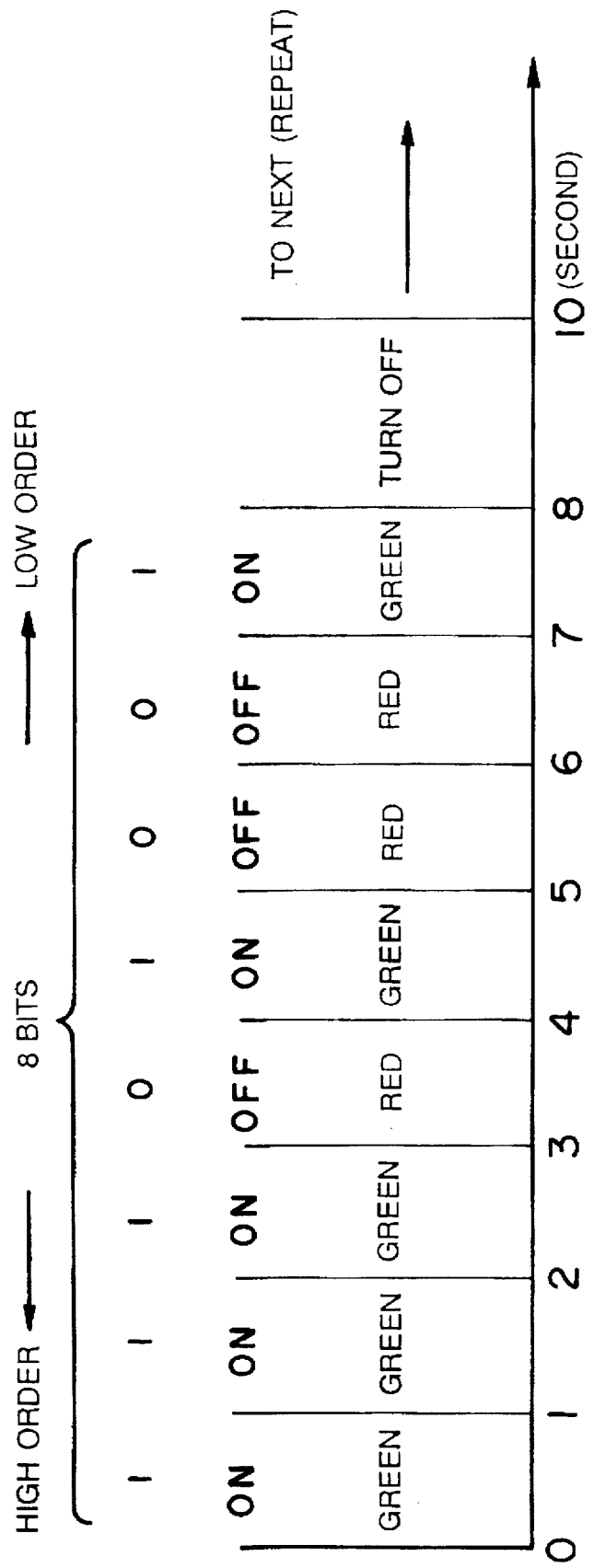
FIG. 8 is an exemplified diagram for use in describing a verification of stored data according to the second embodiment of the present invention.

The write and read unit 142 responds to the value incremented in the counter 19 to read out a bit which is next to the bit previously read out from the register 18 (Step 211) and then returns back to Step 206. Therefore, the processes from Step 206 to Step 211 are repeated until the count value becomes "7" from "0". For instance, in the embodiment shown in FIG. 8, the data to be verified is "203" in decimal.

In this case, the data comprises "11101001" of 8 bits in binary. The bit data from the first bit to the third bit in the 8 bits are "1" so that the green light emitting diode 13a-G is turned on for three seconds. The bit data of the fourth bit is "0" so that the red light emitting diode 13a-R is turned on for one second. The bit data of the fifth bit is "1" so that the green light emitting diode 13a-G is turned on for one second, then bit data of the sixth bit and seventh bit are "0" so that the red light emitting diode 13a-R is turned on for two seconds. The bit data of the eighth bit is "1" so that the green light emitting diode 13a-G is turned on for one second.

Thus, the data to be verified are recognized in time series by green and red by using the two light emitting diodes already disposed on the bar code scanner. Thereby, a dedicated output unit verifying the data is not necessary. Furthermore, the operator can verify that the data is "203" by using a low-priced light emitting diode. A result is that the apparatus can be produced at a low cost.

When the count value of the counter 19 is "7" in Step 209, the light emitting diode control unit 148 turns off the red light emitting diode 13a-R and the green light emitting diode 13a-G only for two seconds (after 8 seconds and before 10 seconds) (Step 212). Then, the process is returned to Step 203, and the counter 19 resets the count value to "0". Furthermore, when the operator wants to verify other data from the data, the processes from Step 204 to Step 212 are executed. When there is no instruction to read out the next data, the counter reset to "0" starts to count the counter value from "0". The data stored in the register 18 is read out bit by bit.

In the second embodiment, the values of the stored data is verified by using two light emitting diodes which are the red light emitting diode 13a-R and the green light emitting diode 13a-G. For instance, the stored data may be verified by using the red light emitting diode 13a-R or the green light emitting diode 13a-G. In this case, one light emitting diode is driven or not driven one after another based on whether each bit data is "1" or "0". That is to say, the stored data is verified by whether the light emitting diode turns on or off.

[Third Embodiment]

A third embodiment of the present invention is now described. In the third embodiment, the values of the data are verified by using a speaker 13b. The speaker 13b is for indicating that the bar code has read. The speaker outputs high-pitched tone when the bit data of the data to be verified is "1". The speaker 13b outputs low-pitched tone when the bit data is "0".

Figure 10:
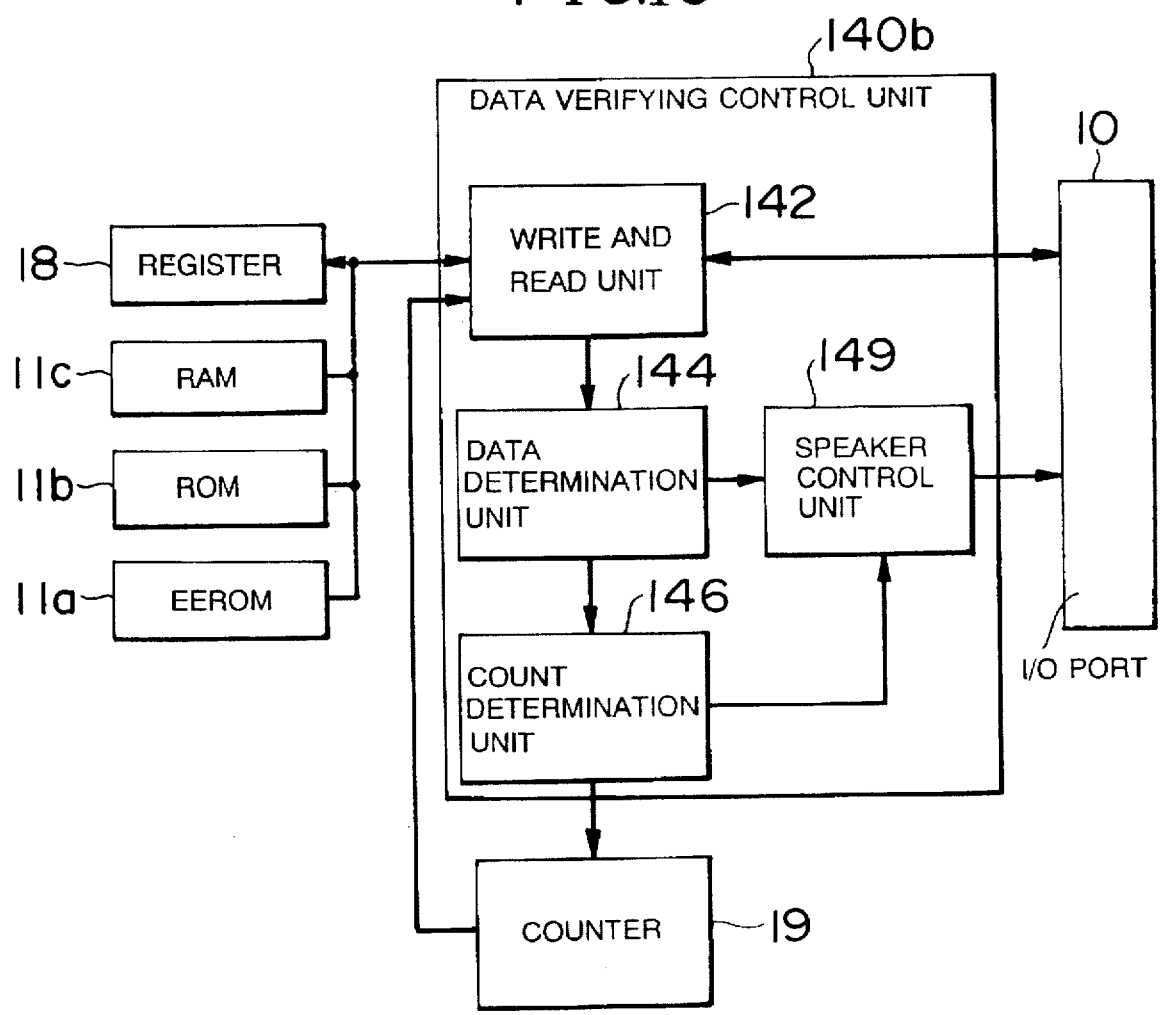
FIG. 10 is a structural block diagram showing a data verifying control unit and a circuit around the unit according to a third embodiment of the present invention.

FIG. 10 is a structural block diagram showing a data verifying control unit and a circuit around the unit according to the third embodiment. The data verifying control unit 140b processes the verification of the data as the CPU 14 executes a verifying program. The data verifying 140b comprises the write and read unit 142, the data determination unit 144, the count determination unit 146, and a speaker control unit 149. The structures of the write and read unit 142, the data determination unit 144, and the count determination unit 146 are the same as described in the second embodiment so that the descriptions of the structures are omitted here.

The data determination unit 144 is connected to the speaker control unit 149. The speaker control unit 149 outputs high frequency signal to the speaker 13b when the bit data is "1". The speaker control unit 149 outputs low frequency signal to the speaker 13b when the bit data is "0". The other structures of this embodiment are the same as described in the second embodiment. The same parts are described by the same numerals.

Figure 12:
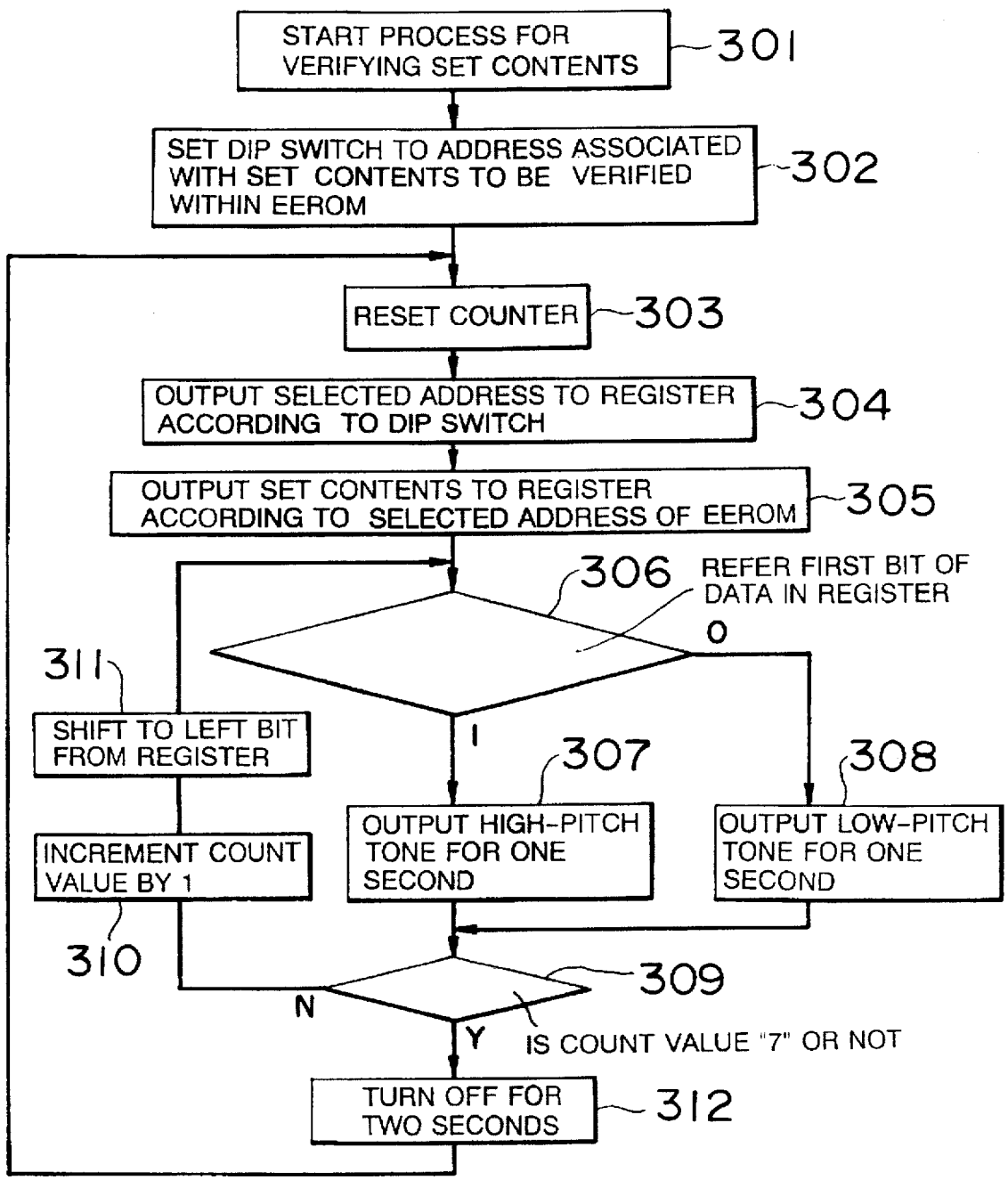
FIG. 12 is a flow chart showing a stored data verifying method according to the third embodiment of the present invention.

The description will now be made regarding a case of a method for verifying the stored data which is accomplished by a bar code scanner according to the third embodiment. Referring to FIG. 12, first, a process for verifying the values of the data set in the EEROM 11a is started (Step 301). Next, the operator sets an address setting switch 22a to an address associated with the data set in the EEROM 11a (Step 302). Then, the counter 19 resets the count value (Step 303). The write and read unit 142 reads out the setting address set in the address setting switch 22a to output the address to the register 18 (Step 304). The write and read unit 142 reads out a stored data associated with the setting address stored in the EEROM 11a to output the stored data to the register 18 (Step 305). As the write and read unit 142 reads out the first bit of the stored data stored in the register 18, the data determination unit 144 determines whether the bit data is "1" or "0" (Step 306).

At this point, when the data determination unit 144 has determined that the bit data is "1", the speaker control unit 149 outputs high frequency signal to the speaker 13b. The speaker 13b outputs a high-pitched tone (Step 307). When the data determination unit 144 has determined that the bit data is "0", the speaker control unit 149 outputs a low frequency signal to the speaker 13b. The speaker 13b outputs a low-pitched tone (Step 308).

Next, the count determination unit 146 determines whether a count value of the counter 19 is "7" or not. (Step 309). When the count determination unit 146 has determined that the count value is not "7", the counter 19 increments the count value by 1 only (Step 310). The write and read unit 142 responds to the value incremented in the counter 19 to read out a bit which is next to the bit already read out from the register 18 (Step 311). The process then returns back to Step 306. Therefore, the processes from Step 306 to Step 311 are repeated until the count value becomes "7" from "0".

Figure 11:
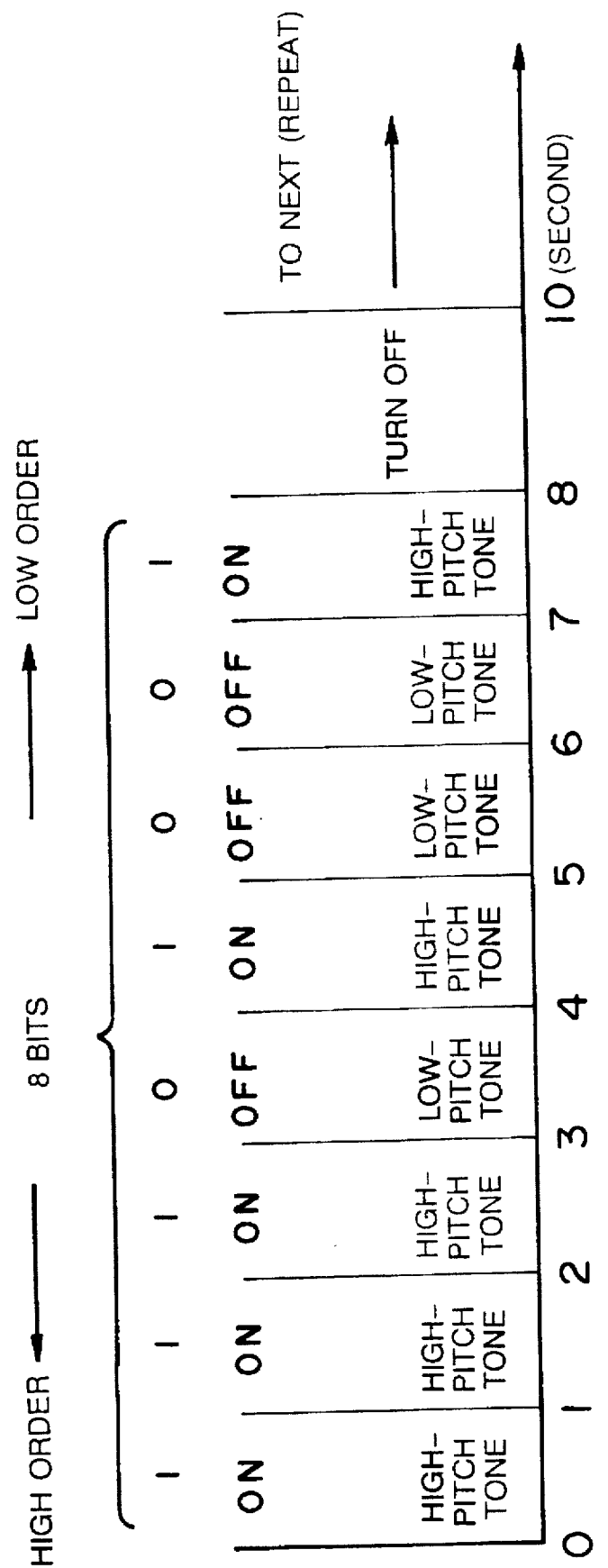
FIG. 11 is an exemplified diagram for use in describing a verification of stored data according to the third embodiment of the present invention.

For instance, in the embodiment shown in FIG. 11, the data to be verified is "203" in decimal. The speaker control unit 149 outputs a high frequency signal when the bit data is "1". The speaker control unit 149 outputs a low frequency signal when the bit data is "0". In this case, the data comprises "11101001" of 8 bits in binary. The bit data from the first bit to the third bit in the 8 bits are all "1" so that the speaker outputs a high-pitched tone for three seconds. The bit data of the fourth bit is "0" so that the speaker outputs a low-pitch tone for one second. The bit data of the fifth bit is "1" so that the speaker 13b outputs a high-pitch tone for one second, then the bit data of the sixth bit and seventh bit are "0" so that the speaker 13b outputs a low-pitch tone for two seconds. The bit data of the eighth bit is "1" so that the speaker 13b outputs a high-pitch tone for one second.

Furthermore, the operator can verify that the data is "203" by the speaker outputting a high-pitch tone or low-pitch tone in time series. When the count value of the counter 19 is "7" in Step 209, the speaker 13b outputs nothing only for two seconds (after 8 seconds and before 10 seconds) (Step 312). Then, the process returns back to Step 303, and the counter 19 resets the count value. When the operator wants to verify other data, the processes from Step 304 to Step 311 are executed.

Moreover, a combination of the second embodiment and the third embodiment is also capable of working. In this case, each bit data outputs to the light emitting diode 13a and the speaker 13b simultaneously so that the values of the data stored in the EEROM is verified.

[Fourth Embodiment]

Figure 13:
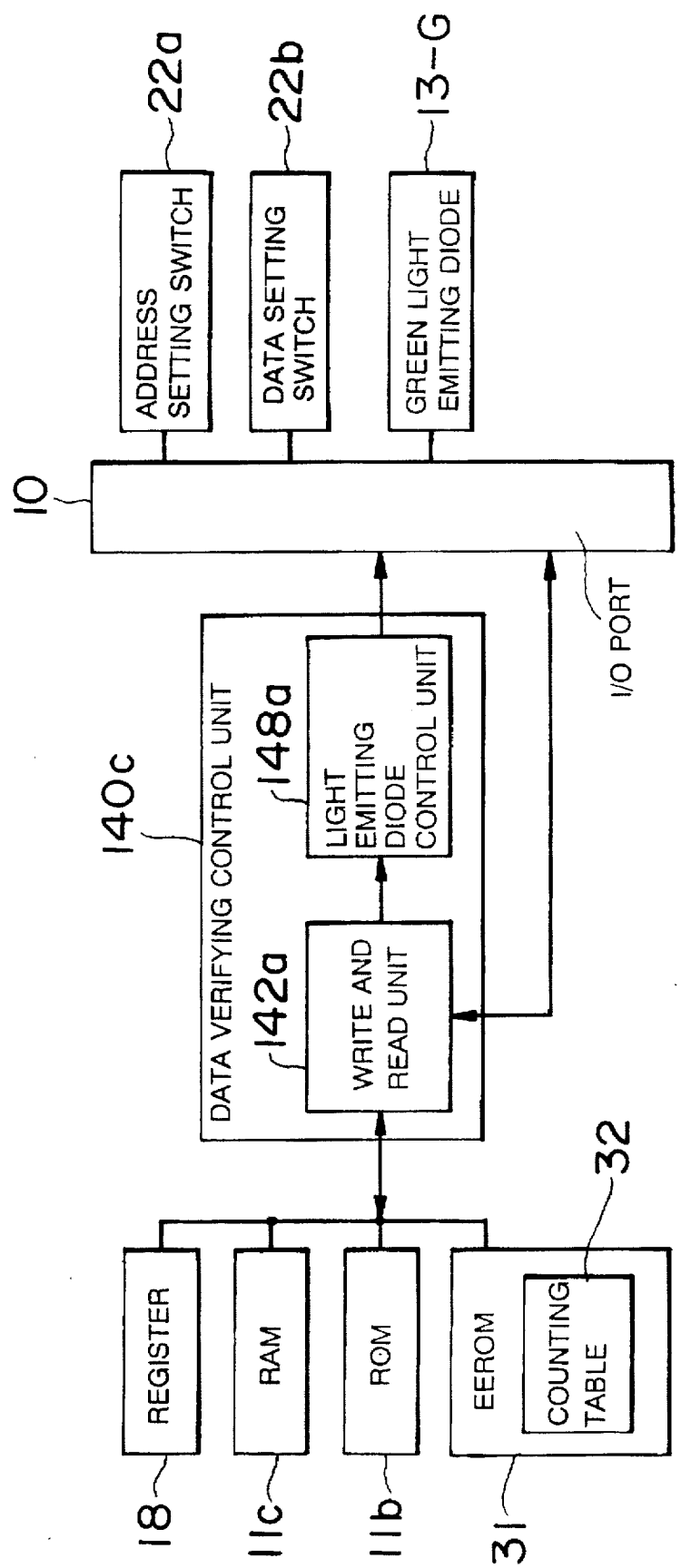
FIG. 13 is a structural block diagram showing a data verifying control unit and a circuit around the unit according to a fourth embodiment of the present invention.

A fourth embodiment of the present invention is now described. In the fourth embodiment, an output unit verifies the data when number of the kinds of the stored data is relatively low. FIG. 13 is a structural block diagram showing a data verifying control unit and a circuit around the unit according to the fourth embodiment.

In FIG. 13, an EEROM 31 stores addresses set in the address setting switch 22a and data set in the data setting switch 22b so that the addresses are associated with the data respectively. At this point, for example, the number of the data is three. The EEROM 31 has a counting table 32. The counting table 32 stores the data and the number of times at which the green light emitting diode 13a-G is driven so that the data are associated with the number of times. FIG. 14 is a diagram showing a counting table 32.

The data verifying control unit 140c processes the verification of the data as the CPU 14 executes a verifying program. The data verifying control unit 140c comprises a write and read unit 142a and a light emitting diode control unit 148a. The write and read unit 142a reads out the data associated with the address selected by the address setting switch 22a. The write and read unit 142a reads out the number of times at which the green light emitting diode 13a-G is driven from the counting table wherein the number of times is associated with the stored data. The write and read unit 142a is connected to the light emitting diode control unit 148a. The light emitting diode 148a drives the green light emitting diode 13a-G at the times which the write and read unit 142a read out. The other structures of this embodiment are the same as those described in the second embodiment.

The write and read unit 142a reads out a data D1 from the EEROM 31 wherein the data D1 is associated with the address selected by the address setting switch 22a. The write and read unit 142a reads out the number of times "1" from the counting table 32 wherein the number of times is number of times at which the green light emitting diode 13a is driven and associated with the data D1. The light emitting diode control unit 148a then drives the green light emitting diode 13a-G once. That is, when the stored data is the data D1, the green light emitting diode 13a-G is driven once.

In the same way as the above, when the stored data is a data D2, the green light emitting diode 13a-G is driven twice. When the stored data is a data D3, the green light emitting diode 13a-G is driven three times. For instance, it is assumed that the stored data is frequency data and the data D1 is 400 Hz. It is assumed that the data D2 is 1 KHz and the data D3 is 10 KHz. In this case, when the stored data is 400 Hz, the green light emitting diode 13a-G is driven once. When the stored data is 1 KHz, the green light emitting diode 13a-G is driven twice. The stored data is 10 KHz, the green light emitting diode 13a-G is driven at three times. Therefore, the operator can verify the values of the stored data by counting the number of times at which the green light emitting diode 13a-G turns on. Thereby, the stored data is simply indicated by one light emitting diode. While the light emitting diode is used in the fourth embodiment, a buzzer may be used instead of the light emitting diode.

[Fifth Embodiment]

Figure 15:
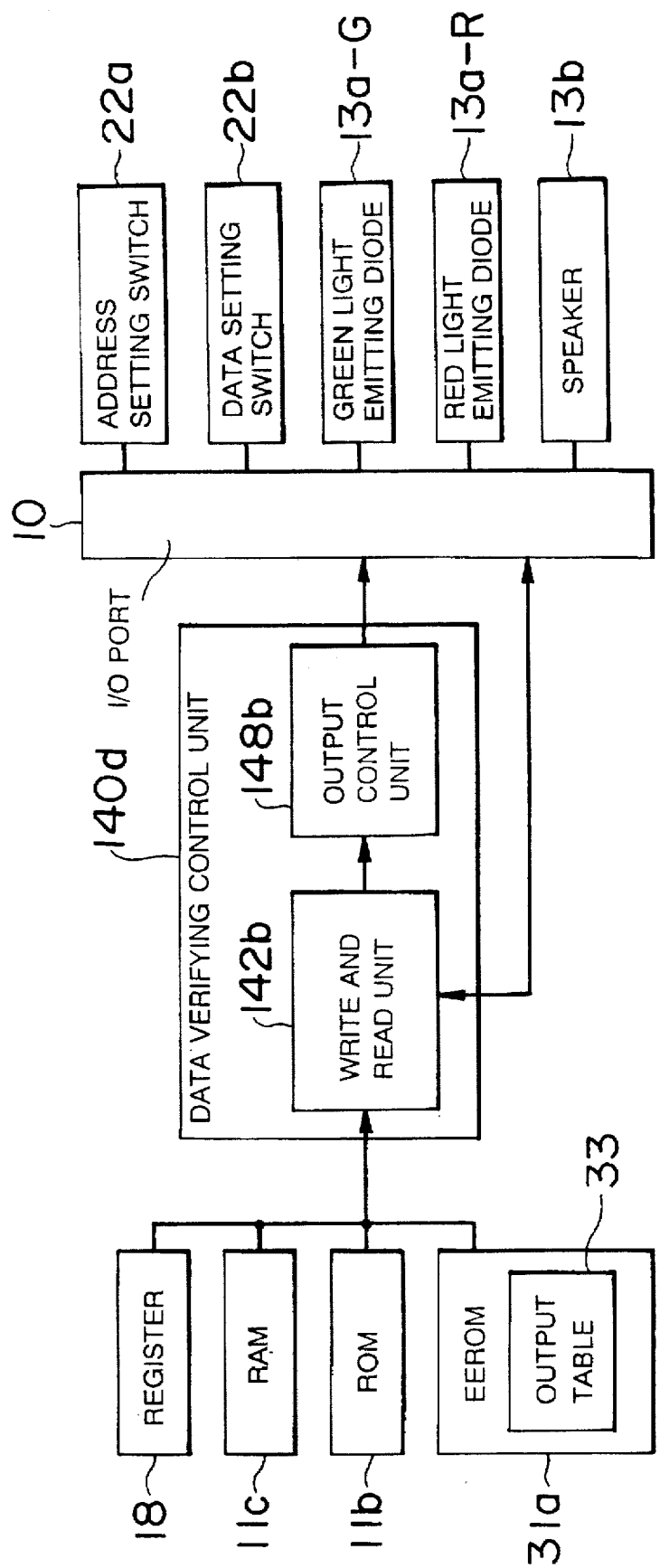
FIG. 15 is a structural block diagram showing a data verifying control unit and a circuit around the unit according to a fifth embodiment of the present invention.

A fifth embodiment of the present invention is now described. FIG. 15 is a structural block diagram showing a data verifying control unit and a circuit around the unit according to the fifth embodiment. In the fifth embodiment, an output unit verifies the data when a number of the kinds of the stored data is relatively low.

The EEROM 31 stores addresses set in the address setting switch 22a and data set in the data setting switch 22b so that the addresses are associated with the data respectively. At this point, for example, the number of the data is three. The EEROM 31a has an output table 33 associating each of the data with output information indicating three output units. FIG. 16 is a diagram showing the output table 33. The apparatus comprises a green light emitting diode 13a-G, a red light emitting diode 13a-R and a speaker 13b each of which is as an output unit corresponding to each of the data.

The data verifying control unit 140d processes the verification of the data as the CPU 14 executes a verifying program. The data verifying control unit 140d comprises a write and read unit 142b and a light emitting diode control unit 148b. The write and read unit 142b reads out a data associated with the address selected by the address setting switch 22a from the EEROM 31. The write and read unit 142b reads out the output information from the output table 33 wherein the output information is associated with the data. The write and read unit 142b is connected to the output control unit 148b. The output control unit 148b activates any of the green light emitting diode 13a-G, the red light emitting diode 13a-R and the speaker 13b, according to the output information read out by the write and read unit 142b.

The other structures of this embodiment are the same as those described in the second embodiment. The write and read unit 142b reads out data D1 associated with the address selected by the address setting switch 22a, from the EEROM 31a. The write and read unit 142b reads out the output information from the output table 33 wherein the output information indicates the green light emitting diode 13a-G associated with the data D1. The output control unit 148b then activates the green light emitting diode 13a-G. That is to say, when the stored data is the data D1, the green light emitting diode 13a-G is driven. In the same way as the above, when the stored data is the data D2, the red light emitting diode 13a-R is driven. When the stored data is the data D3, the speaker 13b is driven.

For instance, it is assumed that the stored data is frequency data and the data D1 is 400 Hz, the same as described in the fourth embodiment. It is assumed that the data D2 is 1 KHz and the data D3 is 10 KHz. Accordingly, the operator can verify the values of the stored data by the light emitting diodes and the speaker. In the second embodiment or the fifth embodiment, while the description is made regarding a case of the bar code scanner, it may be an end apparatus instead of the bar code scanner.

[Sixth Embodiment]

Figure 17:
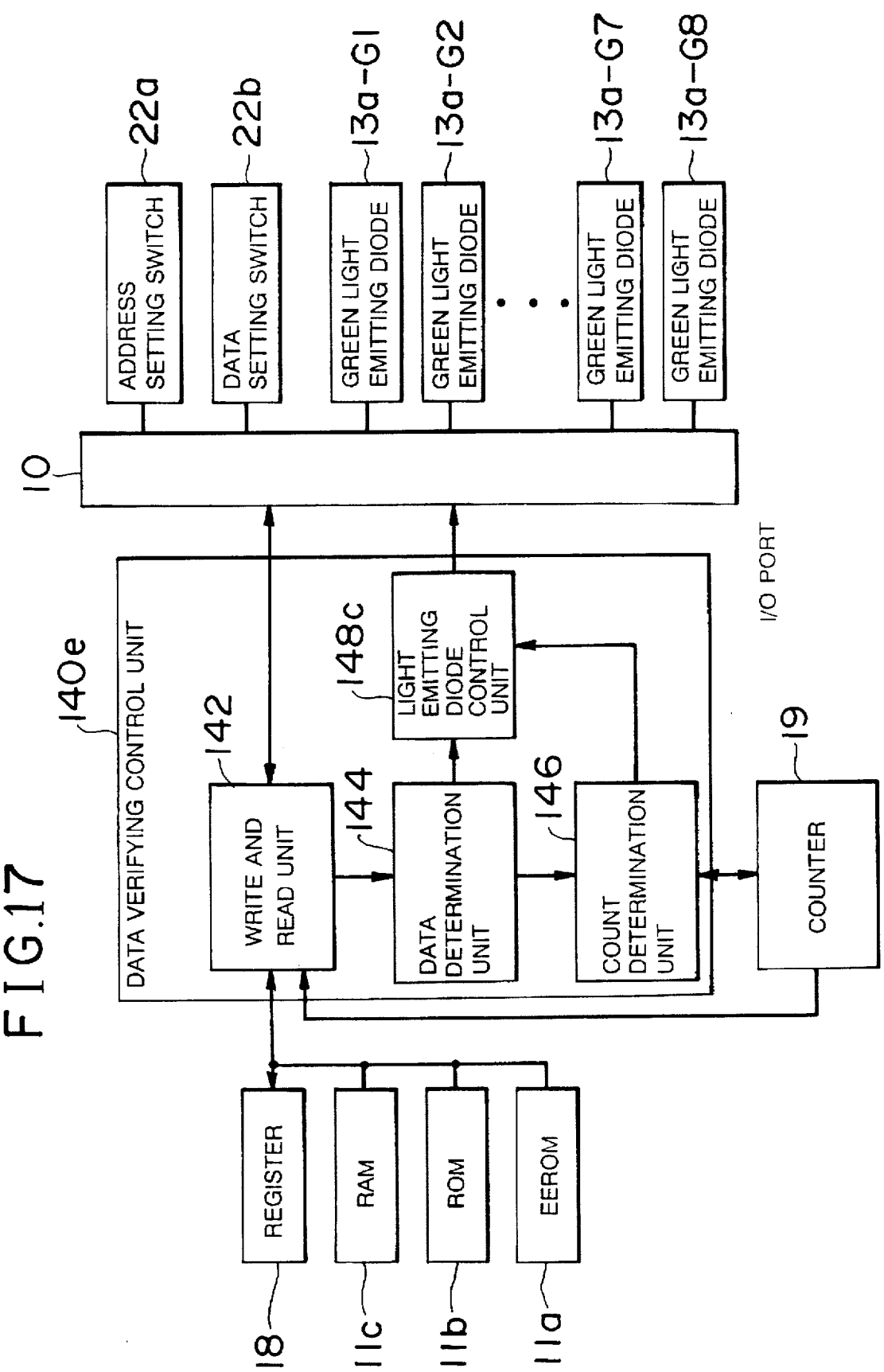
FIG. 17 is a structural block diagram showing a data verifying control unit and a circuit around the unit according to a sixth embodiment of the present invention.

A sixth embodiment of the present invention is now described. The sixth embodiment is a variation of the second embodiment. FIG. 17 is a structural block diagram showing a data verifying control unit and a circuit around the unit according to the sixth embodiment. In FIG. 17, the I/O port 10 is connected to at least eight light emitting diodes 13a-G1~13a-G8 for other purposes. The number of the light emitting diodes corresponds to the number of the bits of the data stored in the EEROM 11a of the second embodiment. The light emitting diode 13a-G1 is associated with the first bit data and the light emitting diode 13a-G8 is associated with the eighth bit data.

The data verifying control unit 140e processes the verification of the data as the CPU 14 executes a verifying program. The data verifying control unit 140e comprises the write and read unit 142, the data determination unit 144, the count determination unit 146, and a light emitting diode control unit 148c. The light emitting diode control unit 148c activates or non-activates the green light emitting diodes 13a-G1~13a-G8 associated with each of the bit data, simultaneously, in accordance with each bit value of 8-bit data determined by the data determination unit 144. The other structures of this embodiment are the same as those described in the second embodiment.

The write and read unit 142 reads out a data associated with the address selected to the address setting switch 22a. The data determination unit 144 determines bit data from the first bit one after another whether the bit data is "0" or "1". The light emitting diode control unit 148c turns on the green light emitting diode associated with the bit data when the bit data is "1". The light emitting diode control unit 148c turns off the green light emitting diode associated with the bit data when the bit data is "0".

For instance, the data comprises "11101001" of 8 bits in binary. The bit data from the first bit, the second bit, the third bit, fifth bit and eighth bit within the 8 bits are all "1" so that the green light emitting diodes 13a-G1, 13a-G2, 13a-G3, 13a-G5, and 13a-G8 are turned on simultaneously. The bit data of the fourth bit, sixth bit, and seventh bit are all "0". Thereby, the green light emitting diodes 13a-G4, 13a -G6, and 13a-G7 are turned off simultaneously. Thus, the values of the 8-bit data are verified simultaneously by using the eight light emitting diodes.

[Seventh Embodiment]

Figure 18:
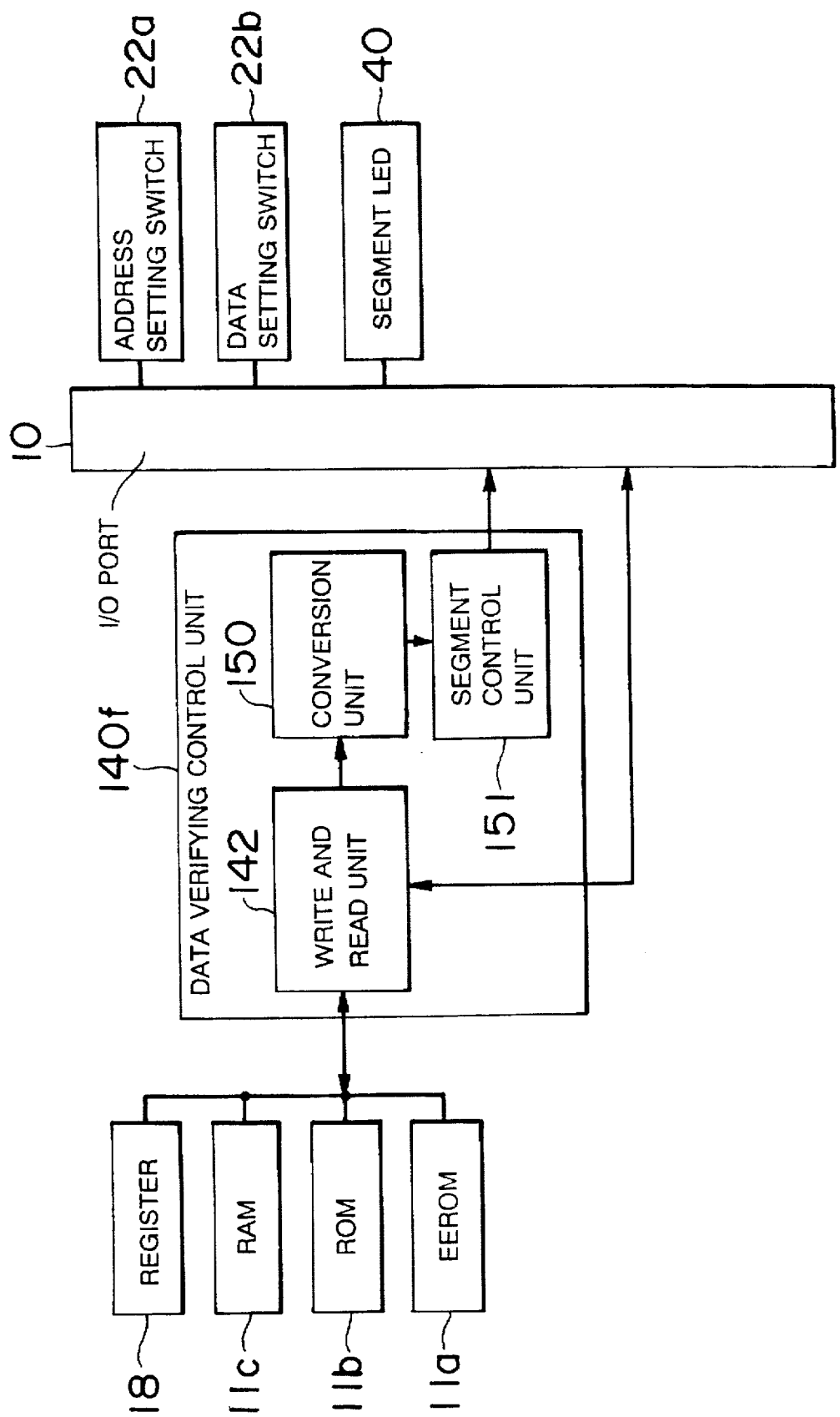
FIG. 18 is a structural block diagram showing a data verifying control unit and a circuit around the unit according to a seventh embodiment of the present invention.
Figure 19:
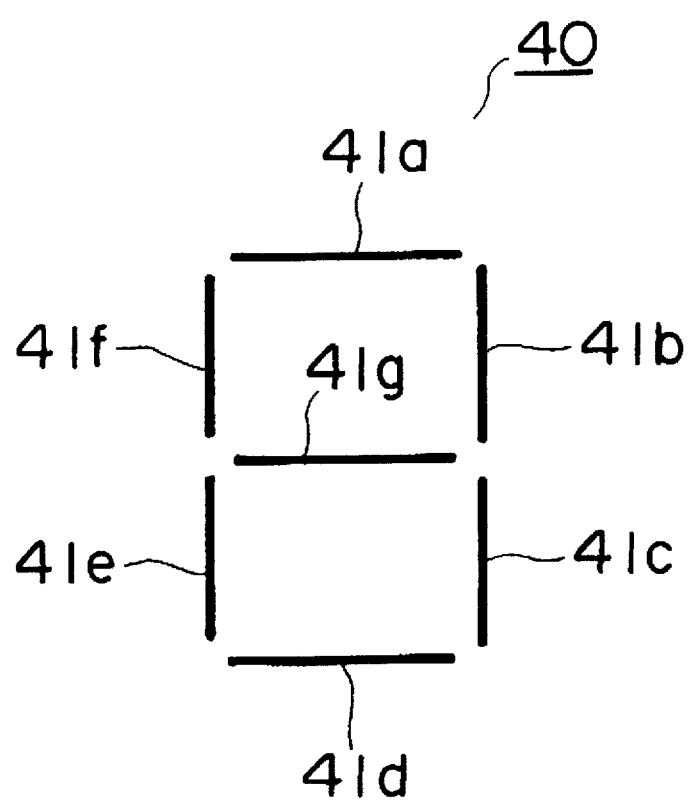
FIG. 19 is a diagram showing a 7-segment LED according to the seventh embodiment of the present invention.

A seventh embodiment of the present invention is now described. The seventh embodiment is a variation of the second embodiment. FIG. 18 is a structural block diagram showing a data verifying control unit and a circuit around the unit according to the seventh embodiment. In FIG. 18, the I/O port 10 is connected to at least one 7 segment LED 40 for other purpose. FIG. 19 is a diagram showing the 7 segment LED. The 7 segment LED comprises seven segments 41a–41g. Each of the segments consists of, for example, a diode. The numbers from 0 to 9 in decimal are indicated by activating or non-activating each of the segments.

The data verifying control unit 140f processes the verification of the data as the CPU 14 executes a verifying program. The data verifying control unit 140f comprises the write and read unit 142, a conversion unit 150, and a segment control unit 151. The conversion unit 150 converts a bit data in binary read out by the write and read unit 142 to a data in decimal. The segment control unit 151 indicates the data in decimal to which is converted by controlling the segments, to the 7 segment LED 40. In this case, one data in decimal consists of 4 -bit data in binary. The other structures of this embodiment are the same as those described in the second embodiment.

The write and read unit 142 reads out a data associated with the address selected by the address setting switch 22a, from the register 18. When the 4-bit data read out from the write and read unit 142 is for example "0001", the conversion unit 150 converts "0001" in binary to "1" in decimal. The segment control unit 151 indicates "1" in decimal to the 7 segment LED 40 by turning on the segments 41b, 41c.

When the 4-bit data read out from the write and read unit 142 is for example "0010", the conversion unit 150 converts "0010" in binary to "2" in decimal. The segment control unit 151 indicates "2" in decimal to the 7 segment LED 40 by turning on the segments 41a, 41b, 41g, 41e, and 41d. In a case that the bar code scanner already has the 7 segment LED 40 as mentioned above, the stored bit data in binary is converted to the data in decimal. The operator can more easily verify the values of the stored data.

[Eighth Embodiment]

Figure 20:
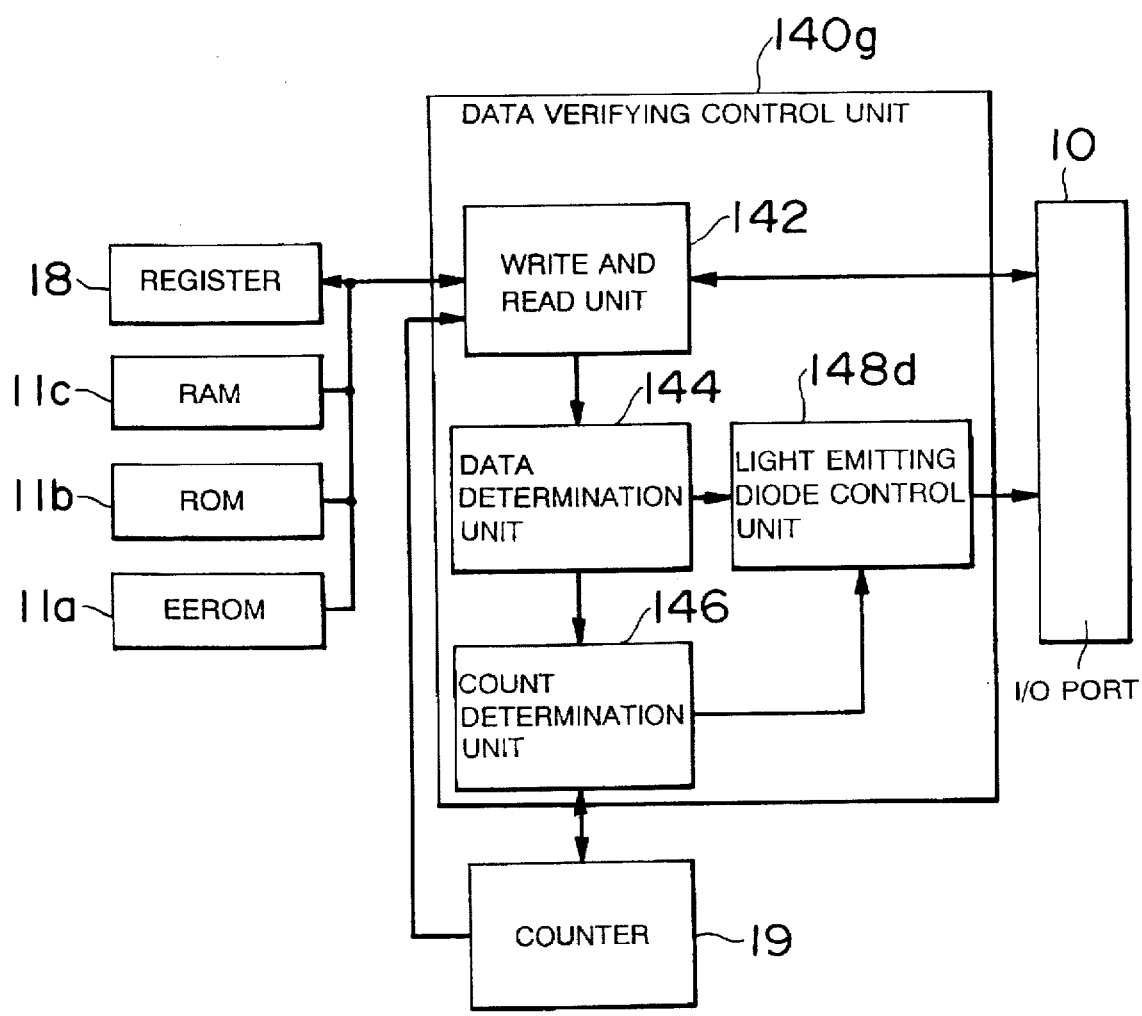
FIG. 20 is a structural block diagram showing a data verifying control unit and a circuit around the unit according to an eighth embodiment of the present invention.

A eighth embodiment of the present invention is now described. The eighth embodiment is a variation of the second embodiment. In the second embodiment, bit data is output to the light emitting diode. In this case, it is difficult for the operator to verify the information of the same bit values when the successive bit data are the same value, for example "1", "1", or "0", "0". FIG. 20 is a structural block diagram showing a data verifying control unit and a circuit around the unit according to the eighth embodiment.

The data verification control unit 140g processes the verification of the data as the CPU 14 executes a verifying program. The data verifying control unit 140g comprises the write and read unit 142, the data verifying unit 144, count determination unit 146, and a light emitting diode 148d. When the bit data is "1", the light emitting diode control unit 148d turns on the green light emitting diode 13a-G for a predetermined period and turns off for a brief period after the predetermined period. When the bit data is "0", the light emitting diode control unit 148d turns on the red light emitting diode 13a-R and turns off for a brief period after the predetermined period. The other structures of this embodiment are the same as those described in the second embodiment.

In the embodiment shown in FIG. 21, the data to be verified is "11101001" in binary. The bit data from the first bit to the third bit within the eight bits are all "1". At this point, the light emitting diode control unit 148d turns on the green light emitting diode 13a-G for 0.8 seconds at each bit data from the first bit to the third bit and then turns it off for 0.2 second. Thereby, the operator can easily verify that the bit data "1" continues successively three times. The bit data of the sixth bit and the seventh bit are "0", respectively. At this point, the light diode control unit 148d turns on the red light emitting diode 13a-G for 0.8 seconds at each bit data from the sixth bit to the seventh bit and then turns it off for 0.2 second. Thereby, the operator can easily verify how many of the bit data of the same value continue successively. In the eighth embodiment, the light diode control unit sets a brief period for which the light emitting diode is turned off. For example, the speaker control unit may set a brief period for which the speaker outputs nothing.

Although several preferred embodiments of the present invention have been shown and described, it will be appreciated by those skilled in the art that changes may be made in these embodiments without departing from the principles and the spirit of the invention, the scope of which is defined in the appended claims.

What is claimed is:

1. An apparatus for verifying stored data without using a dedicating output unit comprising:

memory means for storing a plurality of original data as said stored data at a plurality of addresses;

setting means for setting the plurality of the original data to respectively correspond to the plurality of the addresses in said memory means and for selecting one of the plurality of the addresses;

control means for reading out one of said plurality of original data from said memory means corresponding to said one address selected by said setting means and for determining a value of said one original data, said one original data including a plurality of bits in binary represented by "0" and "1"; and output means for outputting general data which indicates an operation status of the apparatus, for receiving each of said plurality of bits of said one original data one-by-one from said control means, and for outputting said value of said one original data to identify said one original data set to said one address selected by said setting means, said output means including one indicating means for indicating said value of said one original data.

2. An apparatus for verifying stored data as claimed in claim 1, wherein said output means comprises a plurality of indicating means arranged in correspondence with said plurality of bits, respectively, for indicating the value of each of said plurality of bits.

3. An apparatus for verifying stored data as claimed in claim 1, wherein said output means comprises audio means for outputting voice indicating the value of said one original data.

4. An apparatus for verifying stored data as claimed in claim 1, wherein said control means outputs various frequency signals corresponding to the value of each of said plurality of bits to said output means, and said output means comprises audio means for identifying said stored data by varying voice frequency corresponding to said various frequency signals.

5. An apparatus for verifying stored data as claimed in claim 1, wherein said output means comprises segment indicating means having a plurality of segments each for indicating a number in decimal, said control means for converting said plurality of bits to said number in decimal and outputting said number to said segment indicating means.

6. An apparatus for verifying stored data as claimed in claim 1, wherein said output means comprises a plurality of output units corresponding to said stored data, respectively, said memory means storing output information indicating each of said plurality of output units so that said stored data correspond to said output information, respectively, said control means reading out said stored data from said memory means and activating said plurality of output units based on said output information corresponding to the read data to identify the value of the read data.

7. A method for verifying stored data comprising the steps of:
- a storing step for storing a plurality of original data as said stored data at a plurality of addresses;
- a setting step for setting said plurality of said original data to respectively correspond to said plurality of said addresses and selecting one of said plurality of addresses;
- a controlling step for reading out one of said plurality of original data corresponding to said one address selected by said setting step and for determining a value of said one original data, said one original data including a plurality of bits in binary represented by "0" and "1"; and
- an outputting step for outputting general data to indicate an operation status of a device, for receiving each of said plurality of bits of said one original data one-by-one from said controlling step, and for outputting said value of said one original data to identify the one original data set to said one address, said outputting step including one indicating step for indicating the value of said one original data.

8. A method for verifying stored data as claimed in claim 7, wherein said outputting step comprises a plurality of indicating steps respectively corresponding to each of said plurality of bits, to indicate said value of each of said plurality of bits.

9. A method for verifying stored data as claimed in claim 7, wherein said outputting step comprises an audio step for outputting voice indicating the value of said original data.

10. A method for verifying stored data as claimed in claim 7, wherein said controlling step outputs various frequency signals corresponding to the value of each of said plurality of bits, and said outputting step comprises an audio step for identifying said stored data by varying voice frequency corresponding to said various frequency signals.

11. A method for verifying stored data as claimed in claim 7, wherein said outputting step comprises a segment indicating step of activating a plurality of segments each for indicating a number in decimal, said controlling step for converting said plurality of bits to said number in decimal and outputting said number to said segment indicating step.

12. A method for verifying stored data as claimed in claim 7, wherein said outputting step comprises a plurality of output steps respectively corresponding to said stored data, said storing step stores output information indicating each of said plurality of output steps so that said stored data respectively correspond to said output information, said controlling step reading out said stored data and activating said plurality of output steps based on said output information corresponding to said data to identify said value of the read data.

13. An apparatus for verifying stored data without using a dedicating output unit comprising:
- memory means for storing a plurality of original data as said stored data at a plurality of addresses, said stored data in said memory means including a plurality of bits in binary represented by "0" and "1";
- setting means for setting the plurality of the original data to respectively correspond to the plurality of the addresses in said memory means and for selecting one of the plurality of the addresses;
- control means for reading out one of said plurality of original data from said memory means corresponding to said one address selected by said setting means and for determining a value of said one original data; and
- output means for outputting general data from a bar code reader to indicate an operation status of reading a bar code by the bar code reader and for outputting said value of said one original data determined by said control means to identify said one original data set to said one address selected by said setting means, said output means outputting said value responsive to said "0" and "1" representation of the plurality of bits stored in said memory means, said output means outputting each of the plurality of bits stored in said memory means at predetermined time intervals, said control means setting said predetermined time intervals between adjacent bit data of said plurality of bits output by said output means.

14. An apparatus for verifying stored data as claimed in claim 13, wherein said control means sets predetermined time intervals between adjacent data of said plurality of bits output by said output means.

15. An apparatus for verifying stored data without using a dedicating output unit comprising:
- memory means for storing a plurality of original data as said stored data at a plurality of addresses;
- setting means for setting the plurality of the original data to respectively correspond to the plurality of the addresses in said memory means and for selecting one of the plurality of the addresses;
- control means for reading out one of said plurality of original data from said memory means corresponding to said one address selected by said setting means and for determining a value of said one original data; and
- output means for outputting general data which indicates an operation status of the apparatus and for outputting said value of said one original data determined by said control means to identify said one original data set to said one address selected by said setting means, said output means including:
  - one indicating means for outputting said general data to indicate the operation status of the apparatus and for outputting the value of the one original data; and
  - audio means for outputting audio to indicate the operation status of the apparatus and to indicate the value of the one original data.

16. An apparatus for verifying stored data without using a dedicating output unit comprising:
- memory means for storing a plurality of original data as said stored data at a plurality of addresses;
- setting means for setting the plurality of the original data to respectively correspond to the plurality of the addresses in said memory means and for selecting one of the plurality of the addresses;

control means for reading out one of said plurality of original data from said memory means corresponding to said one address selected by said setting means and for determining a value of said one original data, said one original data including a plurality of bits in binary represented by "0" and "1"; and output means for outputting general data which indicates an operation status of the apparatus, for receiving each of said plurality of bits of said one original data one-by-one from said control means, and for outputting said value of said one original data to identify said one original data set to said one address selected by said setting means, said output means including first indicating means for indicating one of said plurality of bits which is "1" and second indicating means for indicating one of said plurality of bits which is "0";

said control means including:

data determination means for sequentially determining whether each of said plurality of bits is "0" or "1"; and output control means for activating one of said first indicating means and said second indicating means for each of said plurality of bits to identify said value responsive to each of said plurality of bits determined by said data determination means, and said output control means, responsive to each of said plurality of bits, turning on one of said first indicating means and said second indicating means for each of said plurality of bits for a predetermined period and then turning off said one indicating means for a brief period.

17. An apparatus for verifying stored data without using a dedicating output unit comprising:

memory means for storing a plurality of original data as said stored data at a plurality of addresses;

setting means for setting the plurality of the original data to respectively correspond to the plurality of the addresses in said memory means and for selecting one of the plurality of the addresses;

control means for reading out one of said plurality of original data from said memory means corresponding to said one address selected by said setting means and for determining a value of said one original data, said one original data including a plurality of bits in binary represented by "0" and "1"; and output means for outputting general data which indicates an operation status of the apparatus, for receiving each of said plurality of bits of said one original data one-by-one from said control means, and for outputting said value of said one original data to identify said one original data set to said one address selected by said setting means;

said control means including:

data determination means for sequentially determining whether each of said plurality of bits is "0" or "1"; and output control means for activating or non-activating said output means to identify said value responsive to each of said plurality of bits determined by said data determination means.

18. An apparatus for verifying stored data without using a dedicating output unit comprising:

memory means for storing a plurality of original data as said stored data at a plurality of addresses;

setting means for setting the plurality of the original data to respectively correspond to the plurality of the addresses in said memory means and for selecting one of the plurality of the addresses;

control means for reading out one of said plurality of original data from said memory means corresponding to said one address selected by said setting means and for determining a value of said one original data; and output means for outputting general data which indicates an operation status of the apparatus and for outputting said value of said one original data to identify said one original data set to said one address selected by said setting means;

said memory means storing said stored data and a plurality of times to activate said output means so that said stored data are associated with said plurality of times, respectively;

said control means reading out said stored data from said memory means and activating said output means at the plurality of times corresponding to said read stored data to identify the value of said read stored data by said plurality of times.

19. A method for verifying stored data comprising the steps of:

storing a plurality of original data as said stored data at a plurality of addresses;

setting said plurality of said original data to respectively correspond to said plurality of said addresses and selecting one of said plurality of addresses;

reading out one of said plurality of original data corresponding to said one selected address;

determining a value of said one original data, said one original data including a plurality of bits in binary represented by "0" and "1"; and outputting general data to indicate an operation status of a device, receiving each of said plurality of bits of said one original data one-by-one, and outputting said value of said one original data to identify said one original data set to said one selected address;

said outputting step including a first indicating step for indicating one of said plurality of bits which is "1" and a second indicating step for indicating one of said plurality of bits which is "0";

said determining step including a data determination step for sequentially determining whether each of said plurality of bits is "0" or "1", and an output controlling step for activating one of said first indicating step and said second indicating step for each of said plurality of bits to identify said value responsive to each of said plurality of bits determined by said data determination step, and responsive to each of said plurality of bits, for turning on one of said first indicating step and said second indicating step for each of said plurality of bits for a predetermined period and then turning off said one indicating step for a brief period.

20. A method for verifying stored data comprising the steps of:

storing a plurality of original data as said stored data at a plurality of addresses;

setting said plurality of said original data to respectively correspond to said plurality of said addresses and selecting one of said plurality of addresses;

reading out one of said plurality of original data corresponding to said one selected address;

determining a value of said one original data, said one original data including a plurality of bits in binary represented by "0" and "1"; and outputting general data to indicate an operation status of a device, receiving each of said plurality of bits of said one original data one-by-one, and outputting said value of said one original data to identify said one original data set to said one selected address;

said determining step including a data determination step for sequentially determining whether each of said plurality of bits is "0" or "1", and an output controlling step for activating or non-activating said outputting step to identify said value responsive to each of said plurality of bits determined by said data determination step.

21. A method for verifying stored data comprising the steps of:

storing a plurality of original data as said stored data at a plurality of addresses;

setting said plurality of said original data to respectively correspond to said plurality of said addresses and selecting one of said plurality of addresses;

reading out one of said plurality of original data corresponding to said one selected address;

determining a value of said one original data, said one original data including a plurality of bits in binary represented by "0" and "1"; and outputting general data to indicate an operation status of a device and outputting said value of said one original data to identify said one original data set to said one selected address;

said storing step further storing a plurality of times to activate said outputting step so that said stored data are associated with said plurality of times, respectively;

said reading step further reading out said stored data and activating said outputting step at the plurality of times corresponding to said read stored data to identify the value of said read stored data by said plurality of times.

22. A bar code reader, comprising:

a memory unit storing a plurality of original data, the original data being setting data associated with functions of the bar code reader, including a plurality of bits, at a plurality of addresses set at the functions, respectively;

a setting unit setting the plurality of original data to respectively correspond to the plurality of the addresses in said memory unit and selecting one of the plurality of addresses;

a control unit reading out one of said plurality of original data from said memory unit corresponding to said one address selected by said setting unit;

a transferring unit transferring said original data read by said control unit to said output unit bit by bit, to output said original data from said output unit; and an output unit informing an operator whether a bar code has been read and informing the operator of the original data, bit by bit.

23. A bar code reader as claimed in claim 22, wherein said output unit is a light emitting diode indicating each of the plurality of bits in binary represented by "0" and "1".

24. A bar code reader as claimed in claim 22, wherein said output unit is a speaker varying voices responsive to a value of each of said plurality of bits.

25. A bar code reader as claimed in claim 22, wherein said control unit sets predetermined time intervals between adjacent bit data of said plurality of bits output by said output unit.

26. A bar code reader as claimed in claim 25, wherein said control unit sets predetermined time intervals between adjacent data of said plurality of bits output by said output unit.

27. A bar code reader as claimed in claim 26, wherein the time intervals between adjacent bit data and the time intervals between adjacent data are set at different time intervals.

* * * * *